(12) United States Patent
Netz

(10) Patent No.: US 6,456,999 B1
(45) Date of Patent: Sep. 24, 2002

(54) AGGREGATIONS SIZE ESTIMATION IN DATABASE SERVICES

(75) Inventor: Amir Netz, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/338,390

(22) Filed: Jun. 22, 1999

(51) Int. Cl.[7] .............................................. G06F 17/30
(52) U.S. Cl. ......................................................... 707/2
(58) Field of Search ................................. 707/1, 2, 3, 5

(56) References Cited

U.S. PATENT DOCUMENTS

| | | | | |
|---|---|---|---|---|
| 5,706,495 A | * | 1/1998 | Chadha et al. ................. 707/2 |
| 5,710,915 A | * | 1/1998 | McElhiney et al. ............. 707/3 |
| 5,799,300 A | * | 8/1998 | Agrwal et al. .................. 707/5 |
| 5,890,151 A | * | 3/1999 | Agrawal et al. ................ 707/5 |
| 5,926,820 A | * | 7/1999 | Agrawal et al. ............. 707/200 |
| 5,963,936 A | * | 10/1999 | Cochrane et al. .............. 707/3 |

* cited by examiner

Primary Examiner—Safet Metjahic
Assistant Examiner—Haythim Alaubaidi
(74) Attorney, Agent, or Firm—Woodcock Washburn LLP

(57) ABSTRACT

A method, apparatus, and software are disclosed for efficient estimation of the size of an aggregation, or summary of data, in a database. This estimate is used in selecting which aggregations are materialized in an OLAP system or relational database. The estimate is based on cardinalities of aggregation levels and of dimension groups consisting of related dimensions, as well as on the size of the underlying detailed data.

45 Claims, 2 Drawing Sheets

AGGREGATIONS SIZE ESTIMATION IN DATABASE SERVICES

RELATED APPLICATIONS

This application is related to the following U.S. applications: U.S. patent application, Ser. No. 09/337,751, entitled "Aggregations Performance Estimation in Database Systems" and U.S. patent application, Ser. No. 09/338,212, entitled: "Aggregations Design in Database Services" Both of these applications were filed on Jun. 22, 1999 and are assigned to the instant assignee.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

TECHNICAL FIELD OF THE INVENTION

The present invention pertains generally to computer-implemented databases, and more particularly to summaries of data contained in such databases.

BACKGROUND OF THE INVENTION

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, a dimension is a structural attribute of a cube that is a list of members of a similar type in the user's perception of the data. For example, a time dimension can consist of days, weeks, months, and years, while a geography dimension can consist of cities, states/provinces, and countries. Dimensions act as indices for identifying values within a multi-dimensional array.

Databases are commonly queried for summaries of data rather than individual data items. For example, a user might want to know sales data for a given period of time without regard to geographical distinctions. These types of queries are efficiently answered through the use of data tools known as aggregations. Aggregations are precomputed summaries of selected data that allow an OLAP system or a relational database to respond quickly to queries by avoiding collecting and aggregating detailed data during query execution. Without aggregations, the system would need to use the detailed data to answer these queries, resulting in potentially substantial processing delays. With aggregations, the system computes and materializes aggregations ahead of time so that when the query is submitted to the system, the appropriate summary already exists and can be sent to the user much more quickly.

Calculating these aggregations, however, can be costly, both in terms of processing time and in terms of disk space consumed. Therefore, in many situations, efficiencies can be realized by materializing only selected aggregations rather than all possible aggregations. The aggregations that are materialized or computed should be selected based on the implications of using or not using each aggregation. These implications include, for example, the cost associated with materializing and maintaining the aggregation. It is well known in the art that a direct relationship exists between the size of an aggregation and the cost involved in querying it.

Thus, the decision of whether to materialize a particular aggregation depends at least in part on the size of the aggregation. Some conventional solutions measure the size of an aggregation by reading and aggregating the detailed data underlying the aggregation. This approach gives an accurate result, but can itself consume considerable computing resources, especially if the aggregation summarizes a large amount of detailed data. Accordingly, a need continues to exist for a system that can estimate the size of an aggregation without reading and aggregating detailed data.

SUMMARY OF THE INVENTION

According to various example implementations of the invention, there is provided an efficient system for estimating the size of an aggregation in a database without reading and aggregating the detailed data underlying the aggregation, as described herein below. In particular, the invention provides, among other things, for using cardinalities of the levels of the aggregation and of the groups of related dimensions to estimate the aggregation size.

One particular implementation is directed to a method for estimating a size of an aggregation that aggregates detailed data in a database characterized by a plurality of dimensions. The aggregation is characterized by aggregation levels corresponding to the dimensions of the aggregation. Level cardinalities are determined for the aggregation levels of the aggregation. Dimension groups are identified that consist of dimensions that are related to each other. For each dimension group, a dimension group cardinality is determined. The size of the aggregation is estimated as a function of the level cardinalities, the dimension group cardinalities, and a size of the detailed data.

In another implementation, level cardinalities are determined for the aggregation levels of the aggregation. Dependent relationships are declared between the dimensions, and dimension groups are identified that consist of dimensions that have dependent relationships with each other. For each dimension group, a dimension group cardinality is determined as the level cardinality of a lowest level of a largest dimension of the aggregation. The size of the aggregation is estimated as a function of a product of the level cardinalities, the dimension group cardinalities, and a size of the detailed data.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

HARDWARE AND OPERATING ENVIRONMENT

Figure 1:
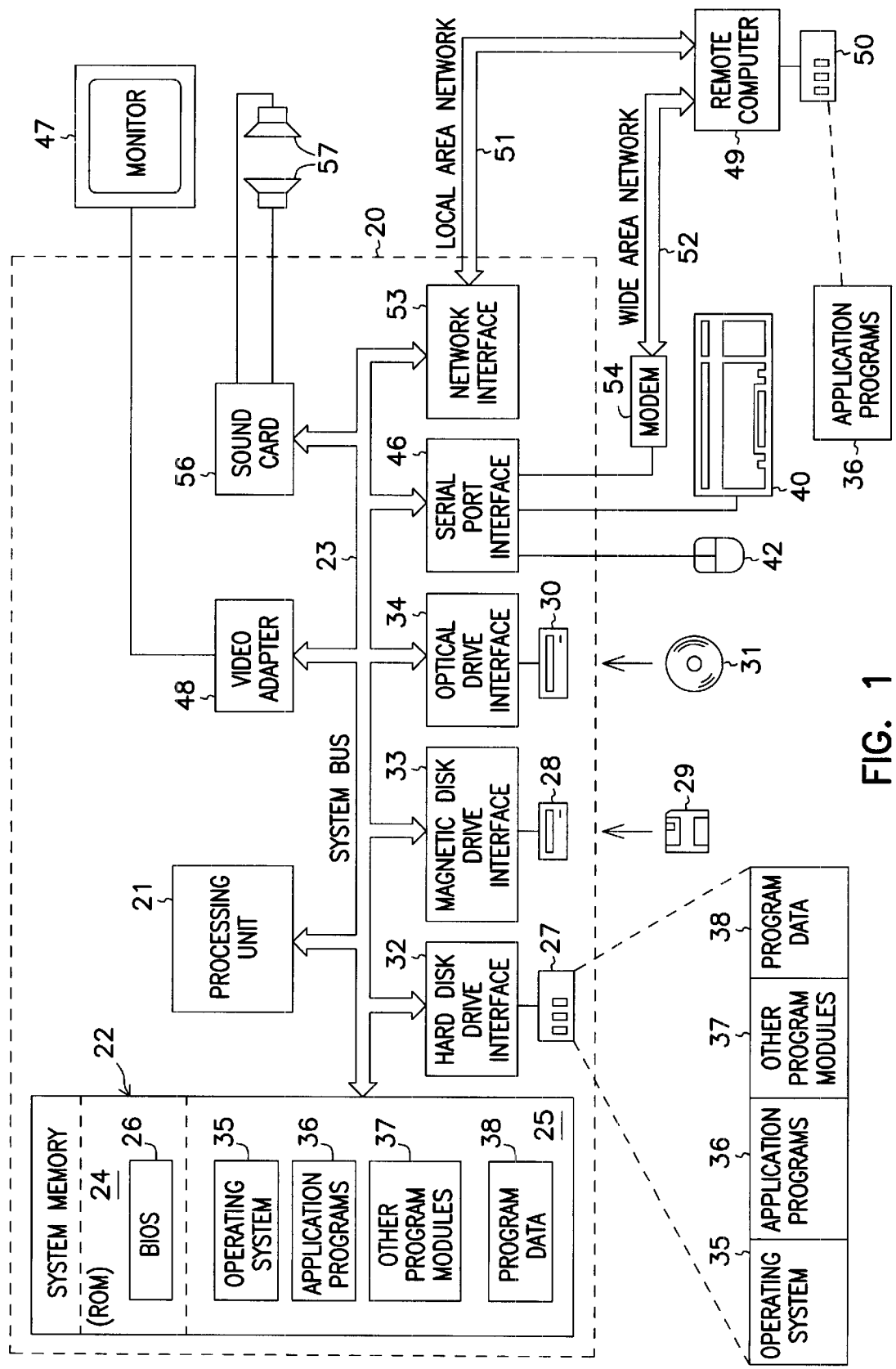
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

EXAMPLE EMBODIMENTS OF THE INVENTION

As an illustrative operational example, a small, three-dimensional OLAP cube is considered. This cube has a time dimension with four hierarchy levels: year, quarter, month, and day. The second dimension, a products dimension, has six levels: all products, department, category, subcategory, brand, and stock keeping unit (SKU). Finally, a geography dimension also has six levels: whole world, region, country, state, city, and ZIP code. It will be appreciated that the OLAP cube can have more or fewer dimensions than in this example.

For an OLAP cube, the number of possible types of aggregations is given by the product of the number of hierarchy levels in each of the dimensions. Thus, considering the OLAP cube described above, a total of 144 (4×6×6) types of aggregations are possible. Optimal performance would be achieved by materializing all of the possible types of aggregations because all of the possible query results would be precomputed. Materializing and maintaining all of these aggregations, however, is costly in terms of both calculation time and disk space. The present invention provides for, among other things, an OLAP system that assists the user in selecting only some of these aggregations by estimating the size of an aggregation, which is directly related to the benefits and costs associated with materializing and maintaining the aggregation. Aggregation size is estimated without reading and aggregating the underlying detailed data, thereby conserving computing resources and yielding faster performance.

As discussed above, aggregations are used to improve the response time of an OLAP system or relational database to queries. Without aggregations, answering queries would involve reading and operating on detailed information on a query-by-query basis, which can consume considerable computing resources. Aggregations allow the system to avoid collecting and aggregating detailed data when a query is executed. Rather, the system computes and materializes aggregations ahead of time so that, by the time a query is issued to the system, the proper summary of the detailed data already exists and can be presented to the user quickly.

According to one example embodiment of the present invention, the size of an aggregation in a relational database or an OLAP system is estimated as a function of the cardinality of the dimension levels of the aggregation and the number of source details. The relationship between the dimensions optionally also affects the estimate. In this respect, the presence of groups of related dimensions, known as dimension groups, affects the estimated size.

An OLAP system can typically be characterized by a number of dimensions, such as time, products, and geography. Each of these dimensions is a collection of attributes according to which detailed data can be aggregated. These attributes generally exist as levels in a hierarchical relationship. For example, in the time dimension, the levels might include years, quarters, and months.

By analogy, in a relational database, each column in a table or view by which a summary, i.e., GROUP BY query, can be created can be considered a level in a dimension. If all of the columns are unrelated, then each column constitutes a dimension having a single level in addition to an implicit ALL level, i.e., "all products." If, on the other hand, a group of columns can be characterized as having a hierarchical relationship, such as region, country, state, and city columns, then all of these columns can be considered a single logical dimension. Each column would be a single level in the dimension.

Aggregations are defined by the level of detail aggregated in each dimension. The level of detail of a dimension is specified using the appropriate hierarchical level of the dimension. For example, one aggregation might be a product family-year-state aggregation. This aggregation uses a hierarchical level for each dimension. The level used in a particular aggregation is known as the aggregation level. Thus, an aggregation can be characterized as a set of aggregation levels, namely, one aggregation level for each dimension. Some OLAP systems do not explicitly include "ALL" levels, e.g., "whole world" or "all products", for all dimensions. These "ALL" levels can be considered implicit in an OLAP cube. If an aggregation level is not specified for a dimension in an aggregation, the aggregation is considered detailed by the "ALL" level of that dimension. For example, a year-state aggregation is equivalent to an all products-year-state aggregation.

It should be understood that, while the disclosure herein refers primarily to dimensions in an OLAP system, the present invention can be implemented for use in a relational database environment as well. Thus, the present invention is not limited in application to OLAP systems.

Each level in a dimension contains one or more distinct values. These values are known as members. For example, if the database includes data for three years, the year level of the time dimension has three members. Assuming the database includes data for each quarter and each month in each year, the quarter and month levels have twelve and thirty-six members, respectively.

Figure 2:
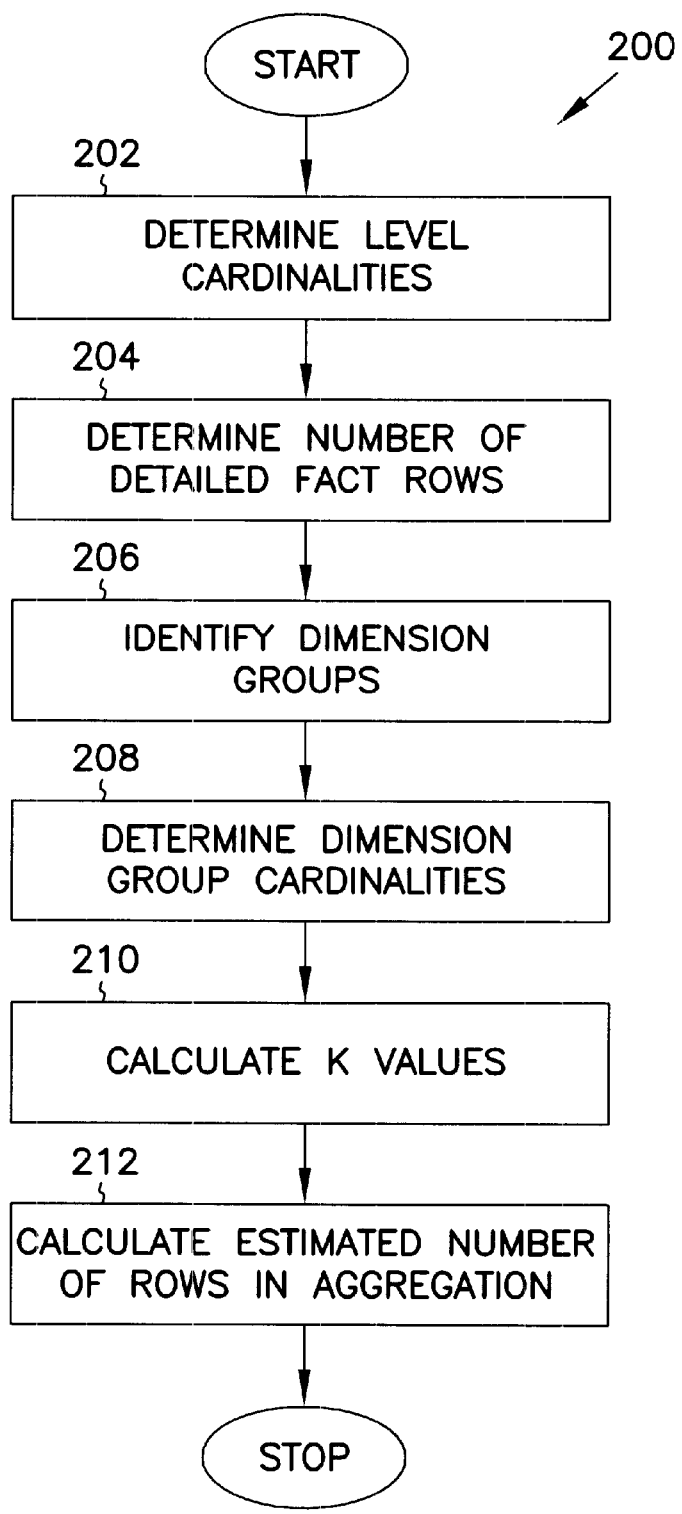
FIG. 2 depicts an example method for estimating the size of an aggregation, according to one embodiment of the present invention.

FIG. 2 depicts an example method 200 for estimating the size of an aggregation, according to one embodiment of the present invention. At a block 202, the system determines the number of members in each level of each dimension, which is one factor affecting the size estimation. This count is known as the cardinality of the level. For example, the year, quarter, and month levels described above have respective cardinalities of three, twelve, and thirty-six.

Counting the number of members in a level is a relatively trivial matter that can be accomplished using any of a variety of techniques. One technique involves actually traversing all of the members of each level and counting the number of unique members. Another technique involves issuing SELECT COUNT (*) type SQL queries to a relational database. Alternatively, the count of the members can be obtained through the application programming interface (API) for the OLAP system. The particular technique used is not significant to the present invention.

Another factor informing the estimation of the size of an aggregation is the number of rows, also known as records or transactions, of underlying detailed facts. In relational databases, these detailed facts are organized as rows in a table known as a fact table. This count is determined at a block 204 of FIG. 2.

In addition, the size estimation is optionally informed by the relationship, if any, between the dimensions. Any two dimensions of a database can be considered either related or independent. Related dimensions logically describe the same entity in different ways. For example, the geography dimension may describe customers by their residency. A customer names dimension may describe them by name. Because both dimensions describe customers, they can be considered related to each other. In a multidimensional database, several dimensions might be related to each other. For instance, education level, income level, geography, and customer name dimensions all describe a customer by different attributes and are all related to each other. These dimensions can be grouped as an entity known as a dimension group.

By contrast, independent dimensions describe completely different entities. For example, the time dimension describes days by calendar designations, and the geography dimension may describe customers by their residency. These concepts are unrelated, and the dimensions are therefore independent. A dimension that is independent from all other dimensions in the database constitutes a particular type of dimension group known as a singleton group.

In the particular implementation of FIG. 2, the user then identifies the dimension groups of the database, as indicated at a block 206. Dimension groups can be defined in a number of ways. A group can be defined explicitly by giving it a name and associating selected dimensions with the name. Another way to define a dimension group involves declaring multiple alternate hierarchies. In a particular embodiment, implemented in OLAP Services, dimension groups are defined implicitly by declaring dependencies between the dimensions of the OLAP system. All dimensions that have direct dependencies are considered a dimension group. Further, all dimensions that have independent dependencies, i.e., through other dimensions, are also considered part of the dimension group.

Next, at a block 208, the system calculates, for each dimension group, a value known as the dimension group cardinality, which is also a factor affecting the estimated size of the aggregation. The cardinality of a dimension group is the number of logical entities that the dimension group describes. For example, a dimension group consisting of residence, education level, income level, and gender dimensions describes the logical entity "customer." If the system manages 100,000 customers, then the customers dimension group cardinality is 100,000. In some cases, the dimension group cardinality may not be known beforehand. In these situations, the cardinality can be determined by submitting a COUNT type SQL query to a relational database. As an alternative, the cardinality of a dimension group can be determined as the level cardinality of the lowest level of the largest dimension. OLAP Services uses this approach.

After the dimension group cardinalities are determined, a value K is calculated, as depicted at a block 210. For each dimension group, the system calculates a product V of the cardinalities of all of the levels of the aggregation whose size is to be estimated. The value K is then calculated as $$K = C \times \{1-[1-(1/V)^C]\}$$

where C denotes the cardinality of the dimension group under consideration. It should be noted that the multiplier $\{1-[1-(1/V)^C]\}$ can not exceed unity. Accordingly, K will be no larger than C. Another value S is then calculated as the product of the values K for all of the dimension groups.

Next, as depicted at a block 212, the value S is used to calculate the estimated number N of rows in the aggregation, that is, the size of the aggregation. The size N of the aggregation is estimated as $$N = F \times \{1-[1-(1/S)^F]\}$$

where F denotes the total number of fact rows in the fact table. It should be noted that the multiplier $\{1-[1-(1/S)^F]\}$ can not exceed unity. Accordingly, N will be no larger than F. Stated differently, the size of the aggregation will never be larger than the total number of rows of the fact table.

It will be appreciated that, while FIG. 2 depicts the steps of the method 200 being performed in a particular order, this order is not essential to the operation of the present invention. To the contrary, the order of the steps can be varied consistent with the invention. For example, while FIG. 2 shows the cardinality of the levels being determined before the dimension groups, the dimension groups can be identified before determining the cardinality of the levels.

In conclusion, the present invention provides a technique for estimating the size of an aggregation. This size information, in turn, is useful for deciding which aggregations of a potentially large number of possible aggregations should be selected for materialization. By materializing and maintaining only selected aggregations, computing resources are conserved. The present invention further conserves computing resources by avoiding scanning and processing detailed data.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof.

What is claimed is:

1. A method for estimating a size of an aggregation that aggregates detailed data in database characterized by a plurality of dimensions, the aggregation being characterized by aggregation levels corresponding to the dimensions of the aggregation, the method comprising:

determining level cardinalities for the aggregation levels of the aggregation;

identifying dimension groups consisting of dimensions that are related to each other;

determining dimension group cardinalities for the identified dimension groups; and estimating the size of the aggregation as a function of the level cardinalities, the dimension group cardinalities, and a size of the detailed data.

2. The method according to claim 1, wherein a level cardinality of a particular aggregation level is determined by traversing a set of members constituting the aggregation level and maintaining a count of unique members.

3. The method according to claim 1, wherein a level cardinality of a particular aggregation level is determined using one of a SQL query and an application programming interface of the database.

4. The method according to claim 1, wherein a dimension group is identified by associating dimensions that are related to a single entity.

5. The method according to claim 1, wherein a dimension group is identified by declaring a plurality of alternate hierarchies.

6. The method according to claim 1, wherein a dimension group is identified by:

declaring dependent relationships between the dimensions; and associating dimensions that have either direct or indirect dependent relationships with each other as a dimension group.

7. The method according to claim 1, wherein the dimension group cardinality for a particular dimension group is determined by submitting an SQL query to the database.

8. The method according to claim 1, wherein the dimension group cardinality for a particular dimension group is determined as the level cardinality of a lowest level of a largest dimension of the aggregation.

9. The method according to claim 1, further comprising:

for each dimension group, calculating a product V of the level cardinalities and a value K as a function of the product V and the dimension group cardinality of the dimension group under consideration;

calculating a product S of the values K for all of the dimension groups; and estimating the size of the aggregation as a function of the product S and the size of the detailed data.

10. The method according to claim 9, wherein the value K is calculated as $C \times \{1-[1-(1/V)^C]\}$, wherein C is the dimension group cardinality of the dimension group under consideration.

11. The method according to claim 9, wherein the size of the aggregation is estimated as $F \times \{1-[1-(1/S)^F]\}$, wherein F is a number of fact rows of the detailed data.

12. A method for estimating a size of an aggregation that aggregates detailed data in a database characterized by a plurality of dimensions, the aggregation being characterized by aggregation levels corresponding to the dimensions of the aggregation, the method comprising:

determining level cardinalities for the aggregation levels of the aggregation;

declaring dependent relationships between the dimensions;

identifying dimension groups consisting of dimensions that have dependent relationships with each other;

for each dimension group, determining a dimension group cardinality as the level cardinality of a lowest level of a largest dimension of the aggregation; and estimating the size of the aggregation as a function of a product of the level cardinalities, the dimension group cardinalities, and a size of the detailed data.

13. The method according to claim 12, further comprising:

for each dimension group, calculating a product V of the level cardinalities and a value K as a function of the product V and the dimension group cardinality of the dimension group under consideration;

calculating a product S of the values K for all of the dimension groups; and estimating the size of the aggregation as a function of the product S and the size of the detailed data.

14. The method according to claim 13, wherein the value K is calculated as $C \times \{1-[1-(1/V)^C]\}$, wherein C is the dimension group cardinality of the dimension group under consideration.

15. The method according to claim 13, wherein the size of the aggregation is estimated as $F \times \{1-[1-(1/S)^F]\}$, wherein F is a number of fact rows of the detailed data.

16. A computer-readable medium for use in estimating a size of an aggregation that aggregates detailed data in a database characterized by a plurality of dimensions, the aggregation being characterized by aggregation levels corresponding to the dimensions of the aggregation, the computer-readable medium having computer-executable instructions for:

determining level cardinalities for the aggregation levels of the aggregation;

identifying dimension groups consisting of dimensions that are related to each other;

determining dimension group cardinalities for the identified dimension groups; and estimating the size of the aggregation as a function of the level cardinalities, the dimension group cardinalities, and a size of the detailed data.

17. The computer-readable medium, according to claim 16, wherein a level cardinality of a particular aggregation level is determined by traversing a set of members constituting the aggregation level and maintaining a count of unique members.

18. The computer-readable medium, according to claim 16, wherein a level cardinality of a particular aggregation level is determined using one of a SQL query and an application programming interface of the database.

19. The computer-readable medium, according to claim 16, wherein a dimension group is identified by associating dimensions that are related to a single entity.

20. The computer-readable medium, according to claim 16, wherein a dimension group is identified by declaring a plurality of alternate hierarchies.

21. The computer-readable medium, according to claim 16, wherein a dimension group is identified by:

declaring dependent relationships between the dimensions; and associating dimensions that have either direct or indirect dependent relationships with each other as a dimension group.

22. The computer-readable medium, according to claim 16, wherein the dimension group cardinality for a particular dimension group is determined by submitting an SQL query to the database.

23. The computer-readable medium, according to claim 16, wherein the dimension group cardinality for a particular dimension group is determined as the level cardinality of a lowest level of a largest dimension of the aggregation.

24. The computer-readable medium, according to claim 16, having further computer-executable instructions for:
for each dimension group, calculating a product V of the level cardinalities and a value K as a function of the product V and the dimension group cardinality of the dimension group under consideration;
calculating a product S of the values K for all of the dimension groups; and
estimating the size of the aggregation as a function of the product S and the size of the detailed data.

25. The computer-readable medium, according to claim 24, wherein the value K is calculated as $C \times \{1-[1-(1/V)^C]\}$, wherein C is the dimension group cardinality of the dimension group under consideration.

26. The computer-readable medium, according to claim 24, wherein the size of the aggregation is estimated as $F \times \{1-[1-(1/S)^F]\}$, wherein F is a number of fact rows of the detailed data.

27. A computer-readable medium for use in estimating a size of an aggregation that aggregates detailed data in a database characterized by a plurality of dimensions, the aggregation being characterized by aggregation levels corresponding to the dimensions of the aggregation, the computer-readable medium having computer-executable instructions for:
determining level cardinalities for the aggregation levels of the aggregation;
declaring dependent relationships between the dimensions;
identifying dimension groups consisting of dimensions that have dependent relationships with each other;
for each dimension group, determining a dimension group cardinality as the level cardinality of a lowest level of a largest dimension of the aggregation; and
estimating the size of the aggregation as a function of a product of the level cardinalities, the dimension group cardinalities, and a size of the detailed data.

28. The computer-readable medium, according to claim 27, having further computer-executable instructions for:
for each dimension group, calculating a product V of the level cardinalities and a value K as a function of the product V and the dimension group cardinality of the dimension group under consideration;
calculating a product S of the values K for all of the dimension groups; and
estimating the size of the aggregation as a function of the product S and the size of the detailed data.

29. The computer-readable medium, according to claim 28, wherein the value K is calculated as $C \times \{1-[1-(1/V)^C]\}$, wherein C is the dimension group cardinality of the dimension group under consideration.

30. The computer-readable medium, according to claim 28, wherein the size of the aggregation is estimated as $F \times \{1-[1-(1/S)^F]\}$, wherein F is a number of fact rows of the detailed data.

31. A computer arrangement for use in estimating a size of an aggregation that aggregates detailed data in a database characterized by a plurality of dimensions, the aggregation being characterized by aggregation levels corresponding to the dimensions of the aggregation, the computer arrangement configured to:
determine level cardinalities for the aggregation levels of the aggregation;
identify dimension groups consisting of dimensions that are related to each other;
determine dimension group cardinalities for the identified dimension groups; and
estimate the size of the aggregation as a function of the level cardinalities, the dimension group cardinalities, and a size of the detailed data.

32. The computer arrangement, according to claim 31, wherein a level cardinality of a particular aggregation level is determined by traversing a set of members constituting the aggregation level and maintaining a count of unique members.

33. The computer arrangement, according to claim 31, wherein a level cardinality of a particular aggregation level is determined using one of a SQL query and an application programming interface of the database.

34. The computer arrangement, according to claim 31, wherein a dimension group is identified by associating dimensions that are related to a single entity.

35. The computer arrangement, according to claim 31, wherein a dimension group is identified by declaring a plurality of alternate hierarchies.

36. The computer arrangement, according to claim 31, wherein a dimension group is identified by:
declaring dependent relationships between the dimensions; and
associating dimensions that have either direct or indirect dependent relationships with each other as a dimension group.

37. The computer arrangement, according to claim 31, wherein the dimension group cardinality for a particular dimension group is determined by submitting an SQL query to the database.

38. The computer arrangement, according to claim 31, wherein the dimension group cardinality for a particular dimension group is determined as the level cardinality of a lowest level of a largest dimension of the aggregation.

39. The computer arrangement, according to claim 31, further comprising:
for each dimension group, calculating a product V of the level cardinalities and a value K as a function of the product V and the dimension group cardinality of the dimension group under consideration;
calculating a product S of the values K for all of the dimension groups; and
estimating the size of the aggregation as a function of the product S and the size of the detailed data.

40. The computer arrangement, according to claim 39, wherein the value K is calculated as $C \times \{1-[1-(1/V)^C]\}$, wherein C is the dimension group cardinality of the dimension group under consideration.

41. The computer arrangement, according to claim 39, wherein the size of the aggregation is estimated as $F \times \{1-[1-(1/S)^F]\}$, wherein F is a number of fact rows of the detailed data.

42. A computer arrangement for use in estimating a size of an aggregation that aggregates detailed data in a database characterized by a plurality of dimensions, the aggregation being characterized by aggregation levels corresponding to the dimensions of the aggregation, the computer arrangement configured to:
determine level cardinalities for the aggregation levels of the aggregation;

declare dependent relationships between the dimensions;

identify dimension groups consisting of dimensions that have dependent relationships with each other;

for each dimension group, determine a dimension group cardinality as the level cardinality of a lowest level of a largest dimension of the aggregation; and estimate the size of the aggregation as a function of a product of the level cardinalities, the dimension group cardinalities, and a size of the detailed data.

43. The computer arrangement, according to claim 42, further configured to:

for each dimension group, calculate a product V of the level cardinalities and a value K as a function of the product V and the dimension group cardinality of the dimension group under consideration;

calculate a product S of the values K for all of the dimension groups; and estimate the size of the aggregation as a function of the product S and the size of the detailed data.

44. The computer arrangement, according to claim 43, wherein the value K is calculated as $C \times \{1-[1-(1/V)^C]\}$, wherein C is the dimension group cardinality of the dimension group under consideration.

45. The computer arrangement, according to claim 43, wherein the size of the aggregation is estimated as $F \times \{1-[1-(1/S)^F]\}$, wherein F is a number of fact rows of the detailed data.

* * * * *